3,397,052
PROCESS FOR CONTROLLING PLANT LIFE
Herbert Q. Smith, King of Prussia, Pa., assignor to Pennsalt Chemicals Corporation, Philadelphia, Pa., a corporation of Pennsylvania
No Drawing. Filed Aug. 29, 1966, Ser. No. 575,555
3 Claims. (Cl. 71—97)

ABSTRACT OF THE DISCLOSURE

Process for the control of plant life using as active agent a hexaalkylditin of structure $$(R)_3-Sn-Sn-(R)_3$$

where R is an alkyl group containing from 1 to 6 carbon atoms.

---

In accord with the invention, the growth of plants is controlled by contacting them with a growth affecting amount of a hexaalkylditin having the structure $$(R)_3-Sn-Sn-(R)_3$$

where R is a lower alkyl group containing from 1 to 6 carbon atoms. It will be understood that the R groups in the above formula may be the same or different.

It is surprising that this limited class of ditins is active as plant growth affecting chemicals since related ditins are inactive. For example, when R is an alkyl group containing 8 carbon atoms, or if R is an aryl group such as phenyl, the corresponding ditins are inactive.

The compounds of the above structure may be used as pre-emergent and post-emergent (contact) herbicides. The lower chain length compounds (e.g., $C_1$ to $C_4$ alkyl) are preferred for pre-emergent use, while the compounds where R is from about 5 to 6 are preferred for post-emergent application. The compounds useful in the invention are known compounds and are prepared in accordance with the procedures set forth by G. Gruttner, Chem. Ber. 50, 1808 (1917), or by other known methods.

The compounds will be used as indicated above for both pre-emergent and post-emergent herbicidal use and may also be employed for desiccant effects. The active compounds will be used at effective concentrations which will generally range from about 1 to 10 pounds per acre, the preferred concentrations being about 2 to 5 pounds per acre. The active concentrations may be used without damaging or destroying the crops and yet achieve excellent control of weeds and undesired vegetation. Lower rates can of course be used to retard weed growth, and higher concentrations may be used to sterilize the soil. The active compounds may be formulated in various ways, but preferably a dispersion of the active ingredient in an aqueous system will be prepared for application and use. In general, the compound will first be dissolved in organic solvents such as diacetone alcohol, xylene, ethylene glycol, diacetone alcohol, methanol, ethanol and the like, and added to water to prepare the water dispersions. Surfactants may or may not be present as desired. Also, suitable water dispersion concentrates may be prepared by ball milling the solid material in water with suitable wetting and suspending agent such as a lignin sulfonate, bentonite, etc. Alternatively, solutions of the agent in organic solvents may be employed for use under field conditions.

Compositions may also be prepared as emulsion concentrates for dilution with water in field application. Concentrates may be prepared with the use of suitable solvents such as xylene, isophorone, heavy aromatic naphtha, methylated naphthalene and the like with the addition of suitable emulsifying agents.

Wettable powders of the reactive agent may also be prepared by direct grinding of the dry compound with a blend of a suitabl dispersing agent such as attapulgite, bentonite, kieselguhr, etc. It is desired to grind such a blend in a hammer mill so that 99% will pass through a 325 mesh screen. Wettable powders may also be prepared by absorbing a solution of the compound in a solvent such as xylene or acetone on a powder of granular clay such as attapulgite or diatomaceous earth. All wettable powder preparations should contain a dispersing agent such as a lignin sulfonate and a wetting agent such as an alky aryl polyether glycol.

The active compounds of the invention may also be used to formulate granules containing 5 to 20% concentration of active herbicidal ingredient. The user may make application by use of the granular applicator rather than a duster or sprayer and known methods in commercial use are applicable for the preparation of granular formulations.

In general, formulated compositions will contain from about 1% to about 90% by weight of the active agent and the use of the compounds and their formulation in pre-emergent weed control applications on various crops will be carried out in the usual fashion. Pre-emergent weed control involves the application of the chemical to the soil some time prior to the emergence of the crop. Application can be conveniently made at the same time as the seeding operation and most commonly involves the use of a sprayer attachment to the planter which applies the diluted chemical on the soil surface immediately after covering the seed. Only a band of the seed row may be treated with the herbicide or the whole area may be treated on a broadcast basis. The chemical may or may not be mixed with the first one or two inches of soil at the time of this application, using a suitable Rototiller type tool.

The pre-emergent herbicides as employed in this invention possess the necessary properties to be effective in field use. Ideally, it should be possible to place a chemical on the soil surface in the zone of germinating weed seeds which are usually above the zone in which the crop plant has been placed. Small weed seeds usually emerge from only the upper inch of soil. However, it is impossible under practical conditions to maintain a separation of the chemical and it is, therefore, necessary for the herbicide to be of a selective type which will control as many undesirable weeds as possible without significant injury to the crop. This requires fairly unique and highly specific properties in the chemical since many of the crop plants are related botanically to weed crops occurring in the same field. The compounds of this invention have these highly selective properties. Furthermore, and particularly important, is the fact that the compounds of this invention are resistant to degradation by various factors which are present in the soil enivronment and which will destroy or mitigate herbicidal activity; viz.: absorption of the active agent by the clay ingredient in the soil, variations in pH values which might cause hydrolytic degradation, microbiological degradation, ultraviolet radiation which degrades the agent loss by volatilization, etc. The herbicides of this invention also have a wide spectrum of weed control, which is desirable because most crops can be infested with many species of both grasses and broad leaf weeds. The pre-emergent herbicides of this invention are adapted for use on specific crop plants and show a high degree of tolerance to many varieties of crops. This tolerance is shown on all types of soils and under various environmental conditions which change the response of the crop to a chemical.

The compositions may also be used in post-emergent applications for weed control where the emerged crop is sufficiently resistant. These applications may be made particularly in the period between emergence and the first cultivation of the crop, but treatments may also be made at later times such as the so-called lay-by treatment after the last possible cultivation to inhibit weed growth up to the time of harvest.

The compounds of the invention and their formulations may also be used as harvest aid chemicals which will either desiccate or defoliate green leaves on susceptible crops and also desiccate any weeds which may be present in order to facilitate the mechanical harvesting with a combine in the case of seed crops. The compounds may also be used in higher doses than normally used for crop application in order to sterilize the soil of all plant growth. Seasonal control of weeds in areas such as industrial sites, roadsides, etc., may be accomplished in this manner.

EXAMPLE 1

A wettable powder was prepared containing 25% by weight of hexamethylditin as active agent, 58.2% fuller's earth, 8.4% sodium lignosulfonate, and 8.4% of a hydrocarbon sulfonate wetting agent. Seeds of various weeds were scattered onto soil in flats and then covered with ⅛" of soil. The wettable powder formulation was added to water and the soil surface treated with the formulation at various rates per acre. The flats were then nurtured in a greenhouse and observations made visually. In this test it was observed that at both 1 and 2 pounds per acre, 100% kill of lamb's-quarter and Amaranthus was obtained. At 1 pound per acre 40% kill of crabgrass was observed and at 2 pounds per acre 80% kill of crabgress was obtained.

In post-emergence (contact) test the formulation was sprayed onto plants of 4" to 8" in height growing in greenhouse flats and 60% desiccation of lamb's-quarter and Amaranthus was observed at 4 pounds per acre.

EXAMPLE 2

A formulation of 10% by weight of hexaethylditin in xylene (85%) containing a surfactant (5% "Triton" X155) was dispersed in with water to make emulsion.

When weed seeds were tested in the pre-emergent technique desscribed in Example 1, 100% kill of lamb's-quarter and Amaranthus was observed at 2 pounds per acre and 80 and 90% kill, respectively, was observed at 1 pound per acre.

EXAMPLE 3

Hexapropylditin was formulated to give a 10% by weight solution in diacetone alcohol (85%) containing 5% surfactant ("Triton" X161), and this was subsequently diluted with water for treatment of weed seeds in the pre-emergent test as described in Example 1.

At 2 pounds per acre 50%, 90%, and 80% kill, respectively, of wild oats, Amaranthus, and lamb's-quarter was observed. At 5 pounds per acre the percentage kill was 70, 100, 100%.

In a post-emergence contact test at 4 pounds per acre, 100% desiccation of Amaranthus and lamb's-quarter was observed.

EXAMPLE 4

Following the procedures of Example 3, hexabutylditin indicated percentage kill respectively of 60% of wild oats, 100% Amaranthus, 70% of lamb's-quarter, 80% crabgrass, and 90% foxtail.

In another test with an aqueous dispersion made from a formulation of 10% hexabutylditin in xylene (85%) containing surfactants (5% "Triton" X155), Black Valentine beans were desiccated, 100% in one day at 1 pound per acre, and 100% in two days at 0.1 pound per acre. Complete trifoliate growth inhibition was obtained in four days at 1.0 pound per acre.

In a similar test with the same hexabutylditin formulation diluted in an essentially non-phytotoxic hydrocarbon oil instead of water, treatment of Black Valentine beans at 1.0 pound per acre caused 100% desiccation in one day, and 100% desiccation in two to three days at 0.1 pound per acre.

EXAMPLE 5

A formulation of 10% hexaisobutylditin in xylene (42.5%) and diacetone alcohol (42.5%) containing surfactant (5% "Triton" X101) was tested in the pre-emergence technique of Example 1. At 5 pounds per acre, 100% kill of Amaranthus, lamb's-quarter and foxtail was obtained and 65% kill of crabgrass was observed.

EXAMPLE 6

A 10% by weight concentration of hexaamylditin in diacetone alcohol formulated as in Example 5 was applied according to the pre-emergenc test of Example 1 at 10 pounds per acre. An 85% kill of Amaranthus and a 90% kill of lamb's-quarter was observed.

EXAMPLE 7

A 10% by weight formulation of hexaoctylditin in xylene (85%) and containing surfactant (5% "Triton" X155) was applied to weed seeds in accordance with the pre-emergence test of Example 2 at 10 pounds per acre. Observation showed zero kill of wild oats, Amaranthus, lamb's-quarter and crabgrass, thus indicating complete inactivity for the compound.

EXAMPLE 8

A wettable powder containing 10% by weight of hexaphenylditin formulated as in Example 1 was applied in a pre-emergence test of Example 1 at 10 pounds per acre. No kill of wild oats, Amaranthus, lamb's-quarter or foxtail was observed.

It will be observed from the above examples that only the lower alkyl ditins as set forth in the invention are active herbicides.

It will be understood that numerous variations and changes may be made from the above description of the invention without departing from its spirit and scope.

I claim:

1. A process for controlling the growth of plants which comprises contacting plants with a herbicidal amount of a hexaalkylditin of structure $$(R)_3—Sn—Sn—(R)_3$$

where R is an alkyl group containing four carbon atoms.

2. The process of claim 1 wherein the active agent is hexabutylditin.

3. The process of claim 1 wherein the active agent is hexaisobutylditin.

References Cited

UNITED STATES PATENTS 3,311,649  3/1967  Molt et al. 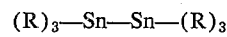 260—29.7

JAMES O. THOMAS, JR., *Primary Examiner.*